(12) United States Patent
Tsukizaki

(10) Patent No.: US 12,024,020 B2
(45) Date of Patent: Jul. 2, 2024

(54) POWER TRANSMISSION DEVICE

(71) Applicant: Nissan Motor Co., Ltd., Yokohama (JP)

(72) Inventor: Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 329 days.

(21) Appl. No.: 17/628,603

(22) PCT Filed: Aug. 28, 2019

(86) PCT No.: PCT/IB2019/001358
§ 371 (c)(1),
(2) Date: Jan. 20, 2022

(87) PCT Pub. No.: WO2021/038266
PCT Pub. Date: Mar. 4, 2021

(65) Prior Publication Data
US 2022/0274477 A1    Sep. 1, 2022

(51) Int. Cl.
| | |
|---|---|
| *B60K 6/387* | (2007.10) |
| *B60K 6/442* | (2007.10) |
| *F16H 63/34* | (2006.01) |

(52) U.S. Cl.
CPC ............. *B60K 6/387* (2013.01); *B60K 6/442* (2013.01); *F16H 63/3416* (2013.01); *B60Y 2200/92* (2013.01)

(58) Field of Classification Search
None
See application file for complete search history.

(56) References Cited

U.S. PATENT DOCUMENTS

| | | | |
|---|---|---|---|
| 7,363,834 B2 * | 4/2008 | Kapp | F16H 63/18 |
| | | | 74/337.5 |
| 9,242,546 B2 * | 1/2016 | Rühle | F16H 61/0025 |

(Continued)

FOREIGN PATENT DOCUMENTS

| | | | | |
|---|---|---|---|---|
| CN | 107763208 A | * | 3/2018 | ........... F16H 53/025 |
| DE | 10133695 A1 | * | 3/2002 | ............... B60K 6/24 |

(Continued)

OTHER PUBLICATIONS

Translated WO-2012160912-A1 (Year: 2024).*

*Primary Examiner* — James A Shriver, II
*Assistant Examiner* — Ian Bryce Shelton
(74) *Attorney, Agent, or Firm* — Global IP Counselors, LLP

(57) ABSTRACT

A power transmission device has a generator driven an internal combustion engine and a drive motor driven by the generator. The power transmission device further has a first clutch mechanism, a second clutch mechanism and a shift cam mechanism. The shift cam mechanism is actuated by a mode actuator to engage and disengage the first and second clutch mechanisms. The first clutch mechanism connect or disconnect power transmission between the drive motor and the drive wheel. The second clutch mechanism connect or disconnect power transmission between the internal combustion engine and the drive wheel. The shift cam mechanism has a first cam groove and a second cam groove that have a first series mode position, a parallel mode position, an internal combustion engine direct connection mode position, a neutral mode position, and a second series mode position, which are provided in that order.

5 Claims, 15 Drawing Sheets

(56) References Cited

U.S. PATENT DOCUMENTS

| | | | |
|---|---|---|---|
| 10,160,348 B2 * | 12/2018 | Tsukizaki | B60W 10/08 |
| 2007/0000340 A1 * | 1/2007 | Kapp | F16H 63/18 |
| | | | 74/337.5 |
| 2007/0204601 A1 * | 9/2007 | Ishii | F01N 13/009 |
| | | | 60/285 |
| 2007/0227283 A1 * | 10/2007 | Fujimoto | F16H 63/48 |
| | | | 74/337.5 |
| 2011/0100144 A1 * | 5/2011 | Neelakantan | F16H 63/18 |
| | | | 74/473.36 |
| 2014/0080650 A1 * | 3/2014 | Ruhle | B60K 6/50 |
| | | | 475/5 |
| 2017/0210224 A1 * | 7/2017 | Younggren | F16H 61/32 |
| 2017/0350505 A1 * | 12/2017 | Hasegawa | F16H 3/32 |
| 2017/0350506 A1 * | 12/2017 | Hasegawa | B62M 25/02 |
| 2018/0045305 A1 * | 2/2018 | Gausrab | F16H 63/18 |
| 2018/0118216 A1 * | 5/2018 | Toyota | F16H 61/32 |
| 2018/0186230 A1 * | 7/2018 | Fukuda | B60W 20/40 |
| 2018/0328487 A1 * | 11/2018 | Nishimoto | F16H 63/3466 |

FOREIGN PATENT DOCUMENTS

| | | | | |
|---|---|---|---|---|
| DE | 102008054977 A1 * | 7/2010 | | B60K 17/3467 |
| DE | 102010049860 A1 * | 6/2011 | | F16H 61/688 |
| DE | 102018101098 A1 * | 7/2019 | | |
| EP | 1333201 A2 * | 8/2003 | | F16H 63/18 |
| JP | 2004-211834 A | 7/2004 | | |
| JP | 2012-197077 A | 10/2012 | | |
| JP | 2013072466 A * | 4/2013 | | |
| JP | 2017011943 A * | 1/2017 | | |
| WO | WO-2005059410 A1 * | 6/2005 | | F16H 63/18 |
| WO | 2012/160912 A1 | 11/2012 | | |
| WO | WO-2012159840 A1 * | 11/2012 | | B60K 6/442 |
| WO | WO-2012160912 A1 * | 11/2012 | | B60K 6/48 |
| WO | WO-2014102869 A1 * | 7/2014 | | B60L 15/08 |
| WO | WO-2018037718 A1 * | 3/2018 | | B60K 6/36 |
| WO | WO-2019141449 A1 * | 7/2019 | | |

* cited by examiner

POWER TRANSMISSION DEVICE

CROSS-REFERENCE TO RELATED APPLICATIONS

This application is a U.S. national stage application of International Application No. PCT/IB2019/001358, filed on Aug. 28, 2019.

BACKGROUND

Technical Field

The present invention relates to a power transmission device.

Background Information

Japanese Laid-Open Patent Application No. 2012-197077 (Patent Document 1) discloses a series hybrid vehicle comprising a power transmission path that directly transmits the power of an internal combustion engine to the drive wheels and a clutch that interrupts the power transmission of the power transmission path. In the document described above, it is disclosed that in a region in which the internal combustion engine has higher efficiency than the drive motor, such as during high-speed travel, the drive wheels are driven directly by the power from the internal combustion engine.

SUMMARY

However, the series hybrid vehicle of the above-described document is configured such that the drive motor is rotated with the rotation of the drive wheels in a travel mode in which the drive wheels are directly driven by power from the internal combustion engine. For this reason, when a structure is employed in which the drive motor is disconnected in the internal combustion engine direct connection mode, in which the drive wheels are directly driven by the power from the internal combustion engine in order to improve fuel efficiency, it is conceivable, when the series mode is switched to internal combustion engine direct connection mode, to activate a state in which both the internal combustion engine and the drive motor are engaged at the same time (parallel mode) and switch from the series mode to the internal combustion engine direct connection mode, in order to prevent the interruption of driving force. At this time, if a shift cam mechanism, in which a drum, on which a cam groove has been formed, as disclosed in Japanese Laid-Open Patent Application No. 2004-211834, is rotated to move a knock pin of a sleeve fitted in the cam groove in the axial direction, thereby moving the sleeve in the axial direction to engage/disengage a two-way clutch, is applied to the above-described series hybrid vehicle having a parallel mode, each two-way clutch for the drive motor and for direct connection of the internal combustion engine will be provided with one knock pin per cam groove, so that two cam grooves must be formed. For this reason, in the case of switching between series mode, parallel mode, and internal combustion engine direct connection mode by a shift cam mechanism, and switching from the internal combustion engine direct connection mode to the series mode, the configuration is such that the two-way clutch for the drive motor is engaged followed by the disengagement of the two-way clutch for direct connection of the internal combustion engine, and when the series hybrid vehicle suddenly decelerates while in the internal combustion engine direct connection mode, it is necessary to switch to the series mode before the series hybrid vehicle stops, so that the two-way clutch for the drive motor will be engaged in a state in which the differential rotation is high; thus, there is the problem that excessive torque fluctuation could occur at the time of engagement. An object of the present invention is to provide a power transmission device that suppresses excessive torque fluctuation when there is a switch from the internal combustion engine direct connection mode to the series mode when the series hybrid vehicle suddenly decelerates.

A power transmission device according to an embodiment of the present invention comprises a first power transmission path for transmitting power between a drive motor and drive wheels, a first clutch mechanism provided with a first sleeve that is engaged or disengaged so as to connect/disconnect power transmission of the first power transmission path, a second power transmission path for transmitting power between the internal combustion engine and the drive wheels, a second clutch mechanism provided with a second sleeve that is engaged or disengaged so as to connect/disconnect power transmission of the second power transmission path, and a shift cam mechanism that is actuated by a mode actuator, that switches between engagement and disengagement of the first clutch mechanism and the second clutch mechanism, and that has a first cam groove and a second cam groove into which the first sleeve and the second sleeve are respectively fitted are provided, wherein the first cam groove and the second cam groove of the shift cam mechanism respectively move the first sleeve and the second sleeve, and have a first series mode position in which the first clutch mechanism is engaged and the second clutch mechanism is disengaged, a parallel mode position in which the first clutch mechanism is engaged and the second clutch mechanism is engaged, an internal combustion engine direct connection mode position in which the first clutch mechanism is disengaged and the second clutch mechanism is engaged, a neutral mode position in which the first clutch mechanism is disengaged and the second clutch mechanism is disengaged, and a second series mode position in which the first clutch mechanism is engaged and the second clutch mechanism is disengaged, and the first series mode position, the parallel mode position, the internal combustion engine direct connection mode, the neutral mode position, and the second series mode position are provided in that order.

Thus, it is possible to suppress excessive torque fluctuations when there is a switch from the internal combustion engine direct connection mode to the series mode when the series hybrid vehicle suddenly decelerates.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings, etc.

First Embodiment

Figure 1:
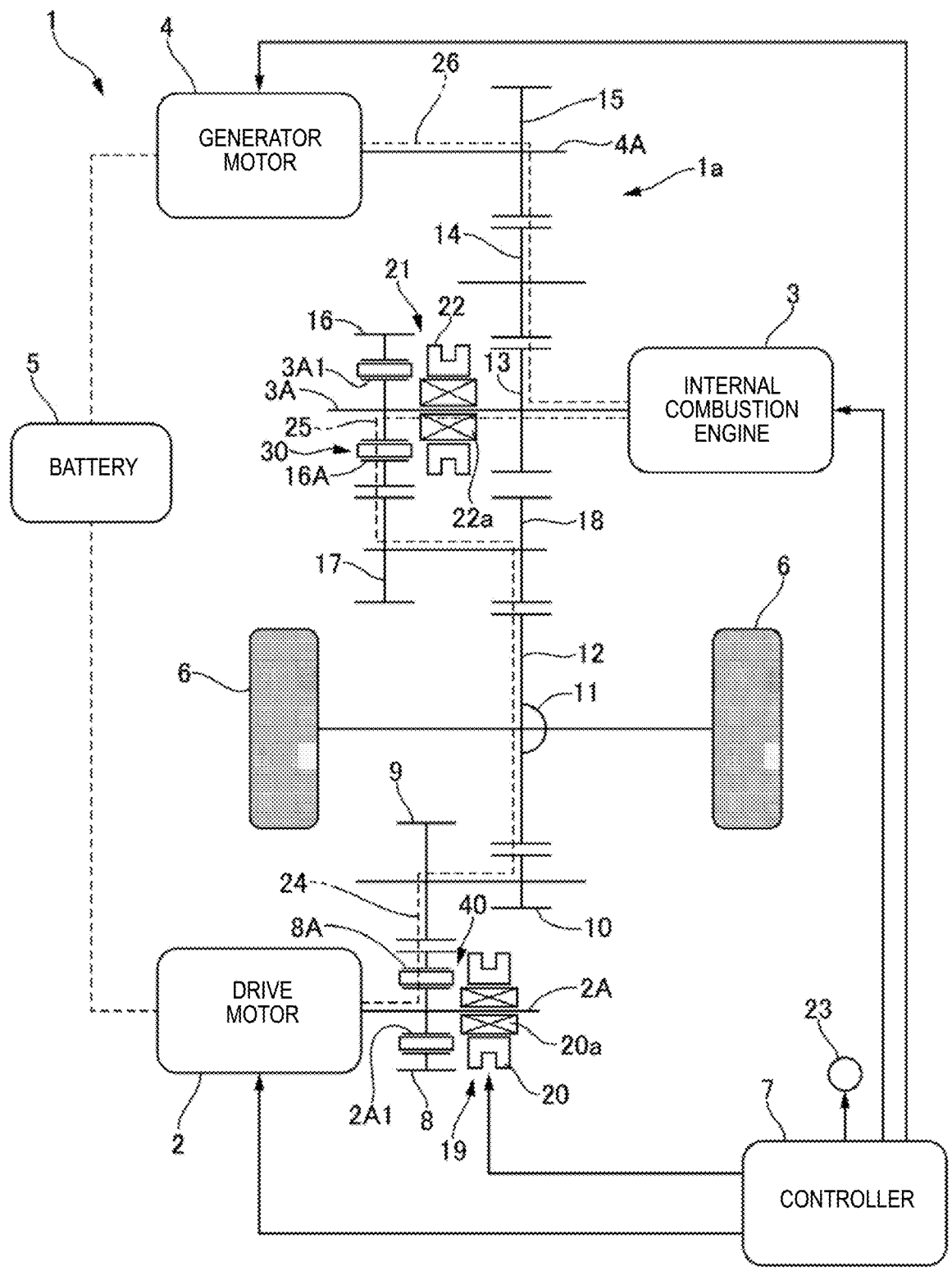
FIG. 1 is a diagram showing a schematic configuration of the power transmission device according to a first embodiment.

FIG. 1 is a diagram showing the schematic configuration of a power transmission device according to the first embodiment.

A series hybrid vehicle 1 comprises an internal combustion engine 3, a power generation motor (generator) 4, a battery 5, a drive motor 2, and a controller 7. The internal combustion engine 3 may be either a gasoline engine or a diesel engine.

The power generation motor 4 is driven by the power from the internal combustion engine 3 to generate electrical power. The power generation motor 4 also has the function of motoring the internal combustion engine 3 by power running using the electric power from the battery 5, described further below.

The battery 5 is charged with the electrical power generated by the power generation motor 4 and the electrical power regenerated by the drive motor 2, described further below.

The drive motor 2 is driven by the electrical power of the battery 5 to drive the drive wheels 6. Further, the drive motor 2 also has a so-called regenerative function, in which through its rotation with the rotation of the drive wheels 6 during deceleration or the like, the deceleration energy is regenerated as electrical power.

The controller 7 controls the drive motor 2, the internal combustion engine 3, and the power generation motor 4.

The controller 7 is composed of a microcomputer provided with a central processing unit (CPU), read-only memory (ROM), random-access memory (RAM), and an input/output interface (I/O interface). The controller 7 may also be composed of a plurality of microcomputers.

Further, a power transmission device 1a of the series hybrid vehicle 1 has a first power transmission path 24 for transmitting power between the drive motor 2 and the drive wheels 6, a second power transmission path 25 for transmitting power between the internal combustion engine 3 and the drive wheels 6, and a third power transmission path 26 for transmitting power between the internal combustion engine 3 and the power generation motor 4.

The first power transmission path 24 is composed of a first reduction gear 8 provided on a rotary shaft 2A of the drive motor 2, a second reduction gear 9 that meshes with the first reduction gear 8, a differential gear 12 provided in a differential case 11, and a third reduction gear 10 that is provided coaxially with the second reduction gear 9 and that meshes with the differential gear 12. Further, the first power transmission path 24 is provided with a first clutch mechanism 19 for switching between states in which the first reduction gear 8 can and cannot rotate relative to the rotary shaft 2A. The first clutch mechanism 19 is composed of a first sleeve 20 that is rotatably supported by the rotary shaft 2A via an axle bearing 20a so as to be slidable in the axial direction, and a two-way clutch 40 composed of a plurality of rollers 40a disposed between the inner circumferential surface 8A1 of an outer race 8A provided on the inner perimeter of the first reduction gear 8 and the outer circumferential surface 2A1a of an inner race 2A1 that is integrated with the rotary shaft 2A (see FIG. 5). The details will be described further below.

If the first clutch mechanism 19 is in an engaged state, the drive motor 2 and the drive wheels 6 are connected and the power of the drive motor 2 is transmitted to the drive wheels 6. In the following description, this state is referred to as the series mode. On the other hand, if the first clutch mechanism 19 is in a disengaged state, the rotation of the rotary shaft 2A of the drive motor 2 is not transmitted to the first reduction gear 8 so that the power transmission from the drive motor 2 to the drive wheels 6 is interrupted.

The second power transmission path 25 is composed of a fourth reduction gear 16 provided on an output shaft 3A of the internal combustion engine 3, a fifth reduction gear 17 that meshes with the fourth reduction gear 16, the differential gear 12 provided in the differential case 11, and a sixth reduction gear 18 that is provided coaxially with the fifth reduction gear 17 and that meshes with the differential gear 12. Further, the second power transmission path is provided with a second clutch mechanism 21 that switches between states in which the fourth reduction gear 16 can and cannot rotate relative to the output shaft 3A. The second clutch mechanism 21 is composed of a second sleeve 22 that is rotatably supported by the output shaft 3A via an axle bearing 22a so as to be slidable in the axial direction, and a two-way clutch 30 composed of a plurality of rollers, not shown, disposed between an outer race 16A provided on the inner perimeter of the fourth reduction gear 16 and an inner race 3A1 that is integrated with the output shaft 3A. The details will be described further below.

If the second clutch mechanism 21 is in an engaged state, the internal combustion engine 3 and the drive wheels 6 are connected and the power of the internal combustion engine 3 is transmitted to the drive wheels 6. In the following description, this state is referred to as the internal combustion engine direct connection mode. On the other hand, if the second clutch mechanism 21 is in a disengaged state, the rotation of the output shaft 3A of the internal combustion engine 3 is not transmitted to the fourth reduction gear 16, so that the power transmission from the internal combustion engine 3 to the drive wheels 6 is interrupted.

The third power transmission path 26 is composed of a seventh reduction gear 13 provided on the output shaft 3A of the internal combustion engine 3, an eighth reduction gear 14 that meshes with the seventh reduction gear 13, and a ninth reduction gear 15 provided on a rotary shaft 4A of the power generation motor 4. The third power transmission path 26 is not equipped with a component for interrupting the power transmission. That is, the third power transmission path 26 is constantly in a state in which power is transmitted.

The engagement/disengagement operations of the first clutch mechanism 19 and the second clutch mechanism 21 are controlled by the controller 7.

In this manner, the series hybrid vehicle 1 can switch between the series mode, in which travel is carried out by transmitting power to the drive wheels 6 by using the first power transmission path 24, and the internal combustion engine direct connection mode, in which travel is carried out by transmitting power to the drive wheels 6 by using the second power transmission path 25, in a state in which the internal combustion engine is directly connected. The controller 7 switches between the series mode and the internal combustion engine direct connection mode in accordance with the driving state, specifically, the vehicle speed and the driving force.

Figure 2:
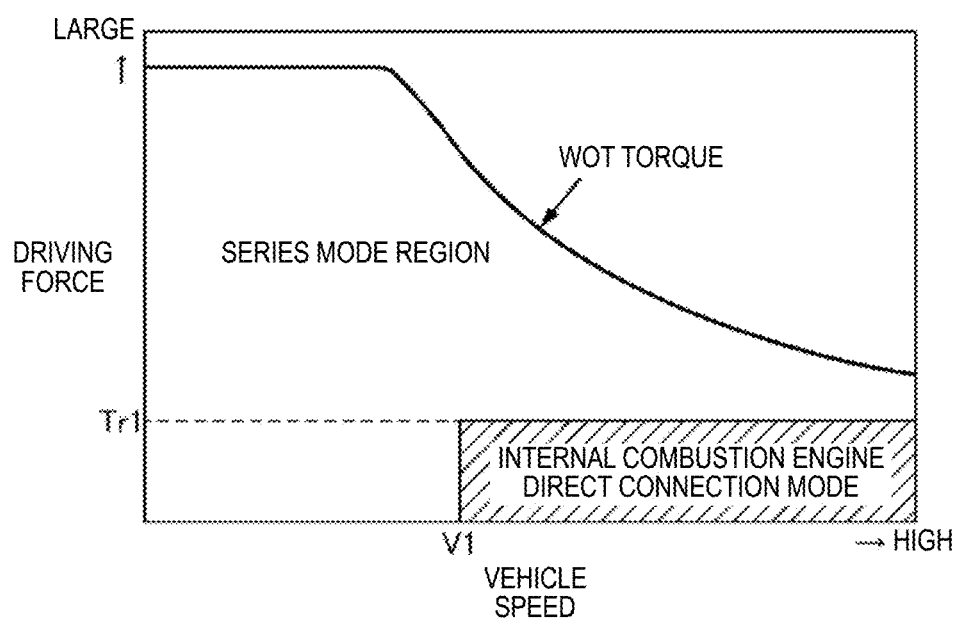
FIG. 2 is a map in which is set a travel mode for each operation region of the first embodiment.

FIG. 2 shows a map in which is set a travel mode for each operation region of the first embodiment. It is an operation region map in which the horizontal axis is the vehicle speed and the vertical axis is the driving force. The WOT in the WOT torque indicated by the solid line in the figure is an abbreviation of Wide Open Throttle, and means a state in which the throttle valve is fully open, i.e., when the accelerator pedal opening degree is fully open. As shown in FIG. 2, the region in which the vehicle speed of the series hybrid vehicle 1 is greater than or equal to V1 and the driving force is less than or equal to Tr1 is the internal combustion engine direct connection region, and the other region is the series mode region.

The vehicle speed V1 is the lower limit vehicle speed at which, when the case of traveling with the power of the internal combustion engine 3 and the case of traveling with the power of the drive motor 2 are compared, traveling with the power of the internal combustion engine 3 is more energy efficient than traveling with the power of the drive motor 2. The vehicle speed V1 is specifically determined in accordance with the specifications of the internal combustion engine 3 and the drive motor 2 that are used. The vehicle speed can be detected by a vehicle speed sensor, not shown.

The driving force Tr1 is the maximum output of the internal combustion engine 3, or the maximum output of the internal combustion engine 3 and the power generation motor 4. Since the driving force is correlated with the accelerator opening degree, the current driving force to be used for a map search is calculated based on the current accelerator opening degree. The accelerator opening degree can be detected by an accelerator opening degree sensor, which is not shown.

Figure 3:
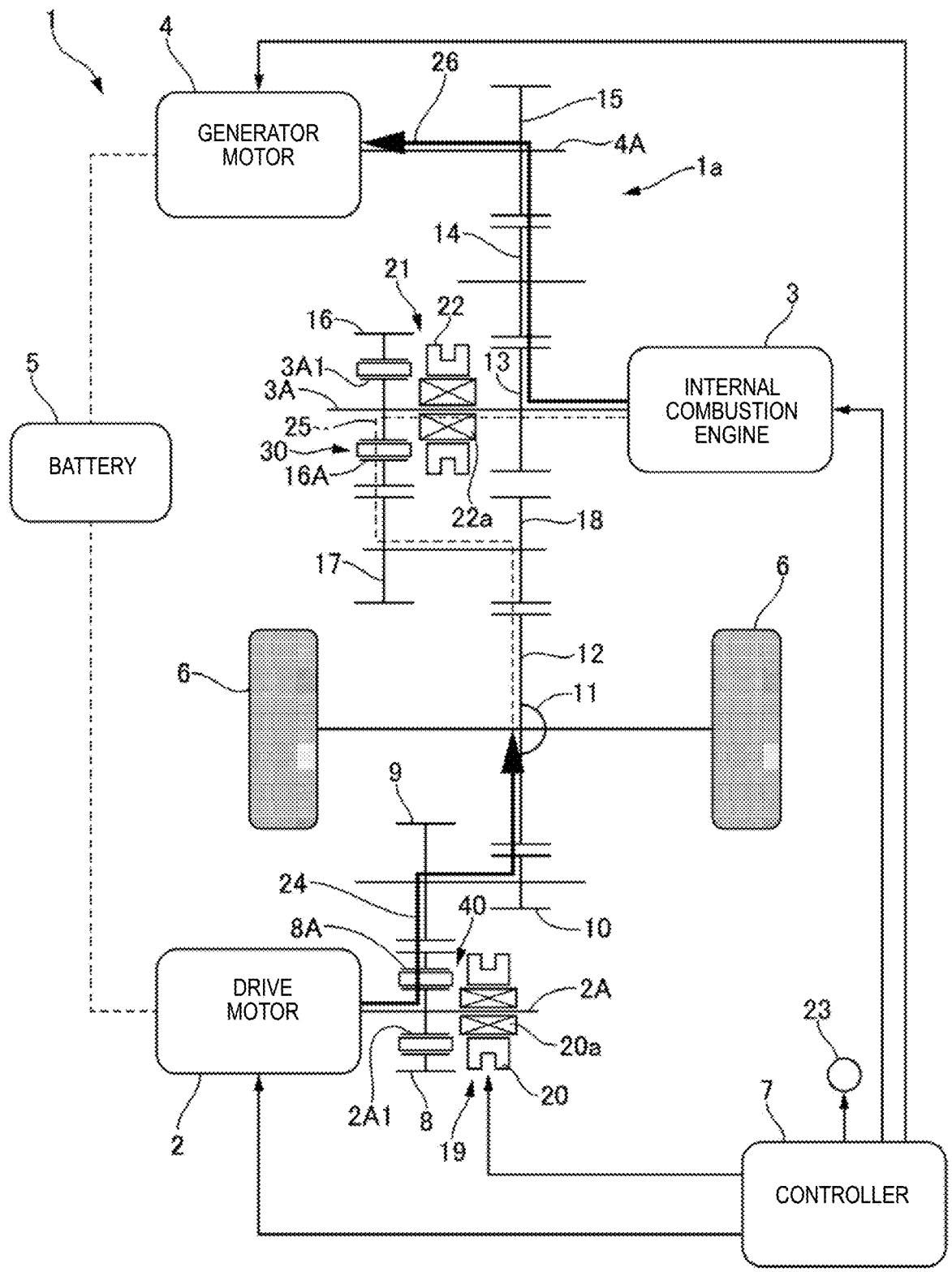
FIG. 3 is a diagram showing the power transmission state in a series mode of the first embodiment.

FIG. 3 is a diagram showing a power transmission state in the series mode of the first embodiment. In the series mode, power is transmitted to the drive wheels 6 via the first power transmission path 24. That is, in the series mode, the power generated by the drive motor 2 is transmitted to the drive wheels 6 as a result of placing the first clutch mechanism 19 in the engaged state. At this time, the second clutch mechanism 21 is in the disengaged state.

Also in the series mode, the power of the internal combustion engine 3 is transmitted to the power generation motor 4 via the third power transmission path 26, the power generation motor 4 generates power, and the generated electrical power charges the battery 5. However, whether or not to generate power with the power generation motor 4 is determined in accordance with the amount of charge on the battery 5, and when it is not necessary to charge the battery 5, the internal combustion engine 3 is stopped.

Figure 4:
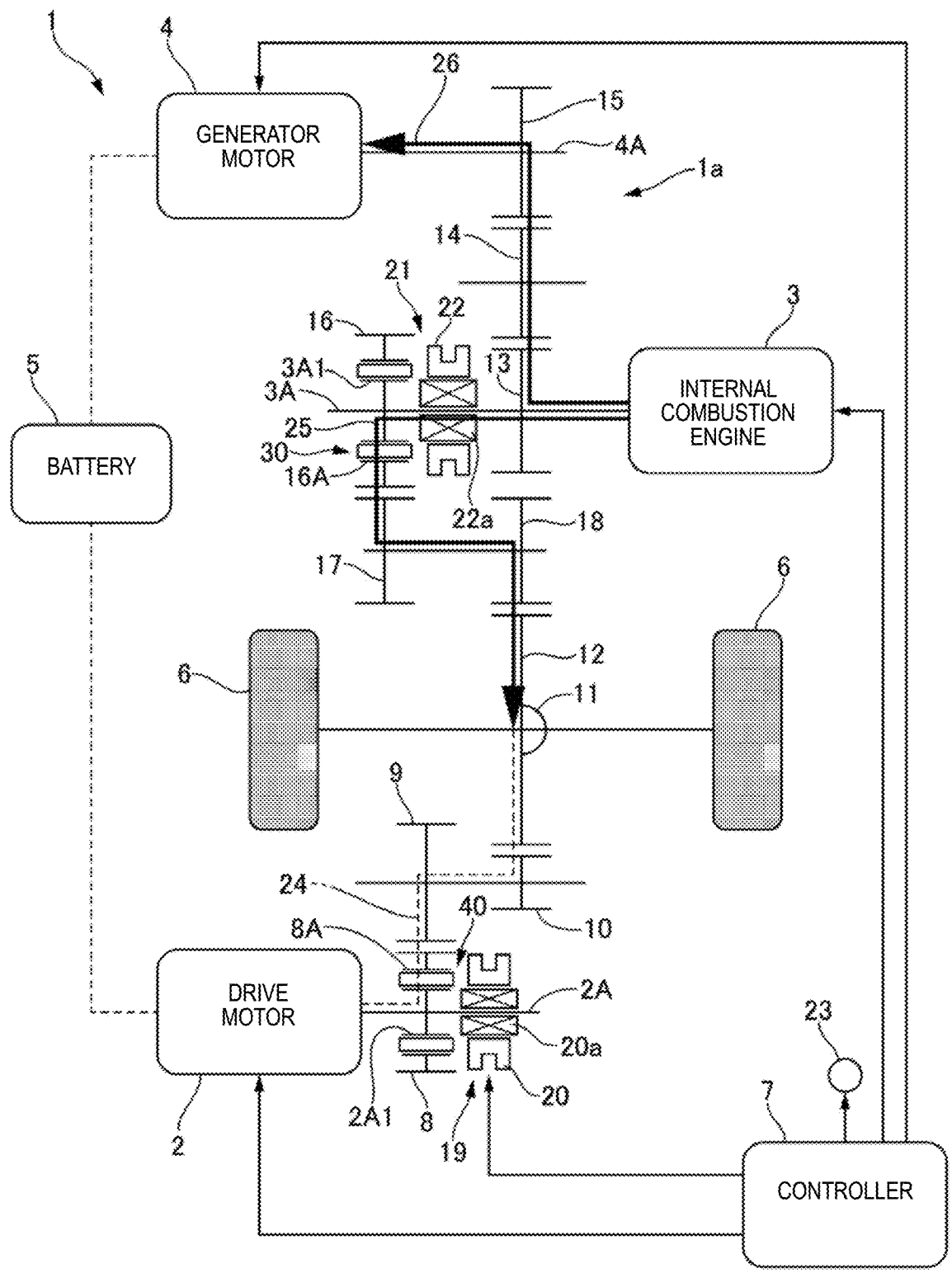
FIG. 4 is a diagram showing the power transmission state in an internal combustion engine direct connection mode of the first embodiment.

FIG. 4 is a diagram showing the power transmission state in the internal combustion engine direct connection mode of the first embodiment. In the internal combustion engine direct connection mode, power is transmitted to the drive wheels 6 via the second power transmission path 25. That is, in the internal combustion engine direct connection mode, the power generated by the internal combustion engine 3 is transmitted to the drive wheels 6 as a result of placing the second clutch mechanism 21 in the engaged state. At this time, the first clutch mechanism 19 is in the disengaged state.

In the internal combustion engine direct connection mode the first clutch mechanism 19 is in the disengaged state. If the first clutch mechanism 19 were placed in the engaged state in the internal combustion engine direct connection mode, the drive motor 2 would rotate with the rotation of the drive wheels 6, thereby generating induced electromotive force. When the battery 5 has sufficient charging capacity, energy is regenerated by charging the battery 5 with the generated electrical power. However, when the battery 5 has insufficient charging capacity, the power generation resistance creates friction that impedes the rotation of the drive wheels 6, which causes decreased fuel efficiency. In contrast, in the present embodiment, since the first clutch mechanism 19 is in the disengaged state in the internal combustion engine direct connection mode, the decrease in the fuel efficiency performance due to the corotation of the drive motor 2 can be suppressed.

Figure 5A:
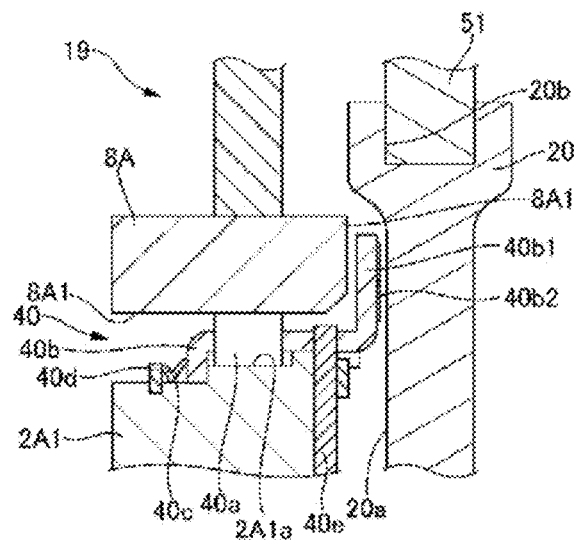
FIG. 5A is a diagram showing the disengaged state of a first clutch mechanism of the first embodiment.
Figure 5B:
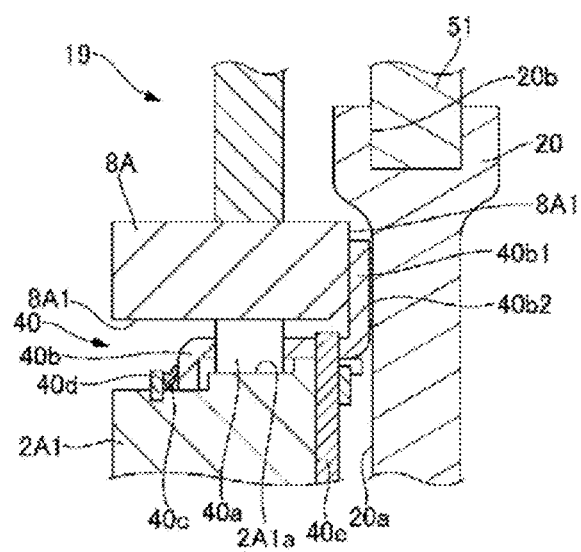
FIG. 5B is a diagram showing the engaged state of the first clutch mechanism of the first embodiment.

FIG. 5A is a diagram showing the disengaged state of the first clutch mechanism of the first embodiment, and FIG. 5B is a diagram showing the engaged state of the first clutch mechanism of the first embodiment.

Since the details are disclosed in Japanese Laid-Open Patent Application No. 2004-211834, the configuration and operation of the first clutch mechanism 19 will be described briefly. In the two-way clutch 40, a plurality of the rollers 40*a* are disposed between the inner circumferential surface 8A1 of the outer race 8A provided on the inner peripheral gear of the first reduction gear 8 and the outer circumferential surface 2A1*a* of the inner race 2A1 that is integrated with the rotary shaft 2A. Although not shown, the outer circumferential surface 2A1*a* of the inner race 2A1 has a polyhedral shape matched to the number of rollers 40*a*. The first sleeve 20 is rotatably supported by the rotary shaft 2A via the axle bearing 20*a* so as to be slidable in the axial direction. Further, a knock pin 51 is integrally disposed in a groove 20*b* formed on the outer circumference of the first sleeve 20.

An extended friction portion 40*b*1 of a retainer 40*b* that houses the plurality of rollers 40*a* opposes an extended end portion 8A1 of the outer race 8A with a slight gap between itself and a planar portion 20*a* and the first sleeve 20. Further, a friction material 40*b*2 is provided on the contact surface of the extended friction portion 40*b*1 with the planar portion 20*a* of the first sleeve 20. As a result, when the planar portion 20*a* of the first sleeve 20 presses the extended friction portion 40*b*1, the first sleeve 20 does not impede the movement of the retainer 40*b* in the rotational direction, so that a stable movement of the retainer 40*b* can be ensured. Further, a rotational direction return spring 40*e* has the function of returning the plurality of rollers 40*a* to the neutral position in the rotational direction. In the state shown in FIG. 5A, the plurality of rollers 40*a* are located in the central portion of the polyhedral shape of the outer circumferential surface 2A1*a* of the inner race 2A1, and there is a gap between the inner race 2A1 and the outer race inner circumferential surface 8A1, so that there is no power transmission. The return spring 40c disposed between the retainer 40b and a retaining race 40d is an axial return spring that attempts to separate the extended friction portion 40b1 of the retainer 40b from the outer race 8A toward the side of the first sleeve 20.

When the first sleeve 20 moves from the disengaged state shown in FIG. 5A in the axial direction toward the side of the retainer 40b, the retainer 40b is moved to the left in the drawing against the biasing force of the axial return spring 40c. As shown in FIG. 5B, when the retainer 40b abuts the end surface 8A1 of the outer race 8A, a rotational resisting force acts on the retainer 40b to move the plurality of rollers 40a against the biasing force of the rotational direction return spring 40e. By using the rotational movement of the retainer 40b in the rotational direction, the plurality of rollers 40a lock the outer race 8A provided on the inner circumference of the first reduction gear 8 and the inner race 2A1 that is integrated with the rotary shaft 2A, thereby completing the engagement of the first clutch mechanism 19. At this time, both the axial return spring 40c and the rotational direction return spring 40e are brought into a compressed state. As a result, in the engaged state, the first reduction gear 8, the plurality of rollers 40a, the retainer 40b, and the rotary shaft 2A rotate integrally.

Further, when there is a transition from the engaged state shown in FIG. 5B to the disengaged state, the first sleeve 20 moves to the right in the drawing. As a result, the retainer 40b is returned to the side of the first sleeve 20 to the right in the drawing by using the biasing force of the axial return spring 40c, and the extended friction portion 40b1 is smoothly separated from the end surface 8A1 of the outer race 8A, to reliably release the engagement. For this reason, the friction force between the retainer 40b and the outer race 8A disappears, and the plurality of rollers 40a are returned to the neutral position by the biasing force of the rotational direction return spring 40e, resulting in the disengaged state. Although a description will be omitted, the second clutch mechanism 21 also has the same configuration.

Figure 6:
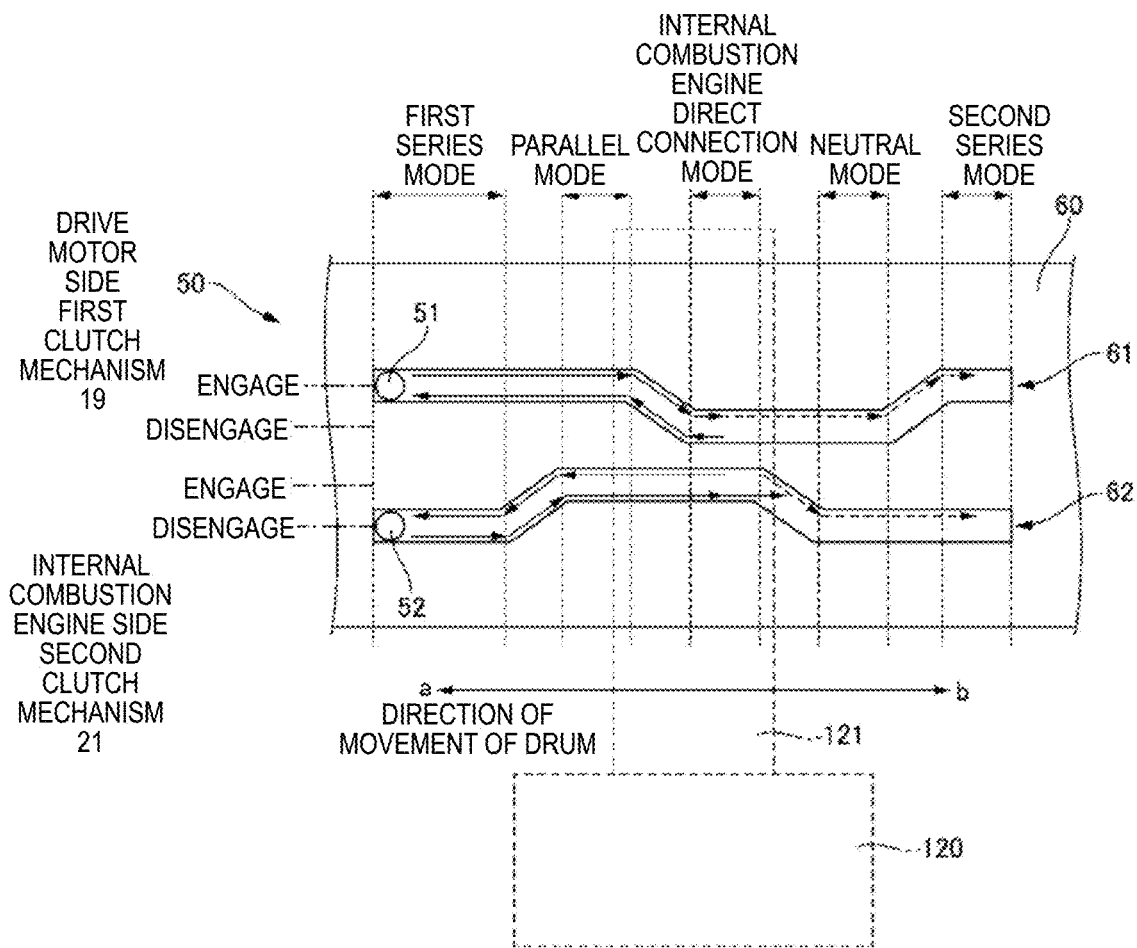
FIG. 6 is a diagram explaining mode switching of a shift cam mechanism of the first embodiment.

FIG. 6 is a diagram for explaining the mode switching of the shift cam mechanism of the first embodiment.

The shift cam mechanism 50 is composed of an electric motor (mode actuator) 120, a drum drive shaft 121 that is driven by the electric motor 120, and a drum 60 that rotates in conjunction with the drum drive shaft 121, moves in the a direction or the b direction shown in the drawing, and on which are formed a first cam groove 61, to which is fitted the knock pin 51 integrally disposed in the first sleeve 20 of the first clutch mechanism 19, and a second cam groove 62, to which is fitted a knock pin 52 integrally disposed in the second sleeve 22 of the second clutch mechanism 21. The knock pins 51 and 52, moving in the first and second cam grooves 61 and 62 in the drum 60, respectively move the first and second sleeves 20 and 22, and can become located in the following positions formed in the drum in the stated order: a first series mode position, in which the first clutch mechanism 19 is engaged and the second clutch mechanism 21 is disengaged; a parallel mode position, in which the first clutch mechanism 19 is engaged and the second clutch mechanism 21 is engaged; an internal combustion engine direct connection mode position, in which the first clutch mechanism 19 is disengaged and the second clutch mechanism 21 is engaged; a neutral mode position, in which the first clutch mechanism 19 is disengaged and the second clutch mechanism 21 is disengaged; and a second series mode position, in which the first clutch mechanism 19 is engaged and the second clutch mechanism 21 is disengaged.

The solid arrows indicate normal mode switching. That is, when the series hybrid vehicle 1 starts moving (series mode region), the knock pins 51 and 52 are positioned in the first series mode position in which the first clutch mechanism 19 is engaged and the second clutch mechanism 21 is disengaged; when the series hybrid vehicle enters the internal combustion engine direct connection mode region, in which the energy efficiency is greater during travel by using the power of the internal combustion engine 3 of the series hybrid vehicle 1, compared to travel by using the power of the drive motor 2, the electric motor 120 is driven and the drum 60 is rotated and moved in the a direction shown in the drawing, and the knock pins 51 and 52 become positioned in the parallel mode position, in which the first clutch mechanism 19 is engaged and the second clutch mechanism 21 is disengaged, and the electric motor 120 is further driven and the drum 60 is rotated and moved in the a direction shown in the drawing, and the knock pins 51 and 52 are positioned in the internal combustion engine direct connection mode position in which the first clutch mechanism 19 is disengaged an the second clutch mechanism 21 is engaged. Further, when the series hybrid vehicle 1 enters the series mode region, the electric motor 120 is driven and the drum 60 is rotated and moved in the b direction shown in the drawing, and the knock pins 51 and 52 are positioned in the parallel mode position in which the first clutch mechanism 19 is engaged and the second clutch mechanism 21 is disengaged, and the electric motor 120 is further driven and the drum 60 is rotated and moved in the b direction shown in the drawing, and the knock pins 51 and 52 are positioned in the first series mode position in which the first clutch mechanism 19 is engaged and the second clutch mechanism 21 is disengaged. The parallel mode position is arranged between the series mode position and the internal combustion engine direct connection mode position in order to prevent the interruption of driving force during switching between the series mode and the internal combustion engine direct connection mode.

The dashed arrows indicate the mode switching that takes place when the series hybrid vehicle 1 suddenly decelerates while the vehicle is in the internal combustion engine direct connection mode. If the series hybrid vehicle 1 suddenly decelerates when the knock pins 51 and 52 are in the internal combustion engine direct connection mode position in which the first clutch mechanism 19 is disengaged and the second clutch mechanism 21 is engaged, the electric motor 120 is driven and the drum 60 is rotated and moved in the a direction shown in the drawing, and the knock pins 51 and 52 become positioned in the neutral mode position in which the first clutch mechanism 19 is disengaged an the second clutch mechanism 21 is disengaged, and the electric motor 120 is further driven and the drum 60 is rotated and moved in the a direction shown in the drawing, and the knock pins 51 and 52 are positioned in the second series mode position in which the first clutch mechanism 19 is engaged and the second clutch mechanism 21 is disengaged. In this manner, since it is possible to switch to the second series mode via the neutral mode, the first clutch mechanism 19 is engaged in the second series mode after the differential rotation of the first clutch mechanism 19 is reduced in the neutral mode, so that torque fluctuations during mode switching can be suppressed.

Figure 7:
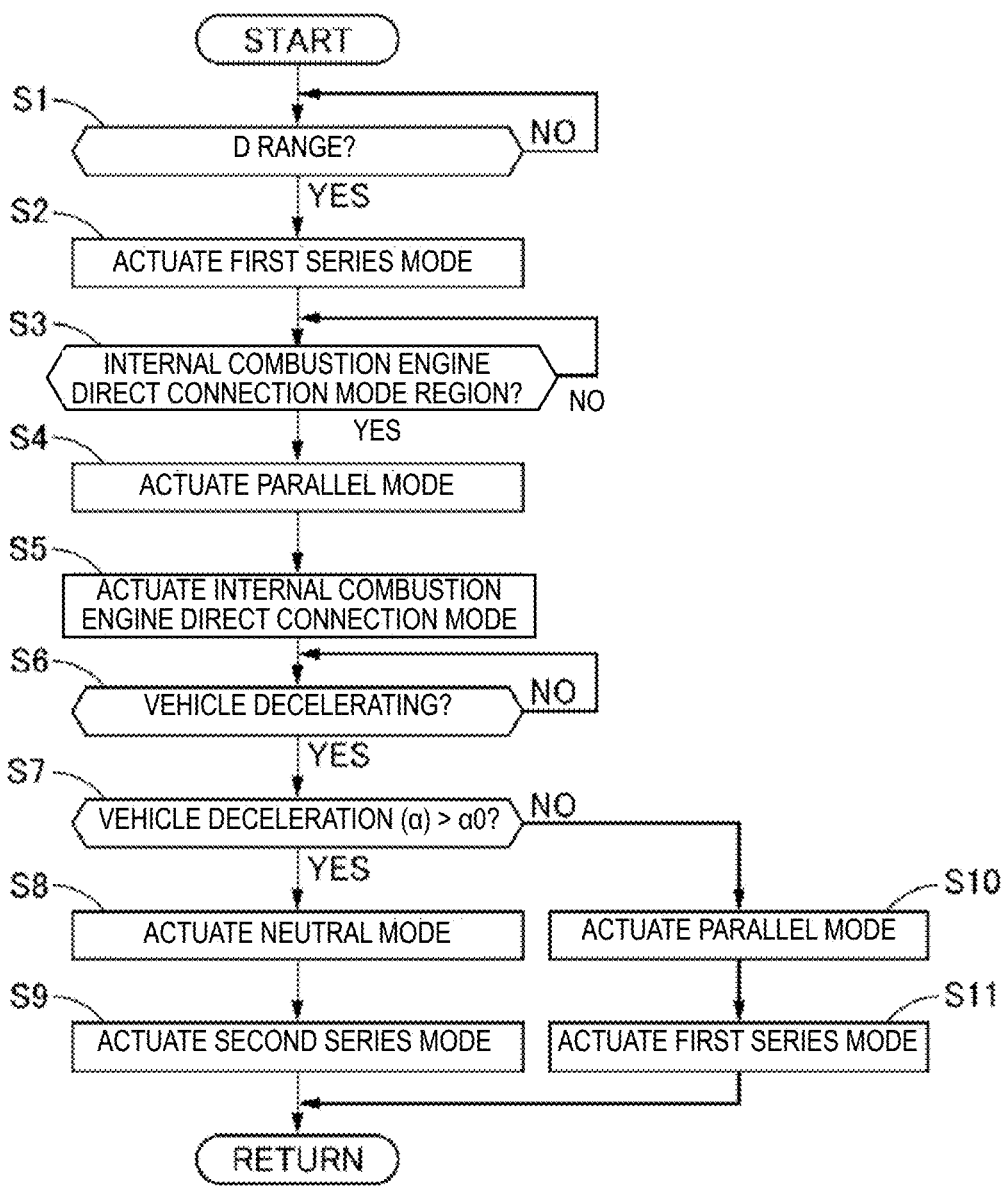
FIG. 7 is a flowchart showing the control routine of the shift cam mechanism of the first embodiment.

FIG. 7 is a flowchart showing a control routine of the shift cam mechanism of the first embodiment. The control routine is programmed in the controller 7. The flowchart is repeatedly executed at a prescribed calculation cycle.

In Step S1, it is determined whether it is in the D range. When it is in the D range, the process proceeds to Step S2, and when it is not in the D range, the process returns to Step S1.

In Step S2, the controller 7 drives the electric motor 120, and the knock pins 51 and 52 are positioned in the first series mode position, in which the first clutch mechanism 19 of the shift cam mechanism 50 is engaged and the second clutch mechanism 21 is disengaged, to activate the first series mode.

In Step S3, it is determined whether the series hybrid vehicle 1 has entered the internal combustion engine direct connection mode region. If the series hybrid vehicle 1 has entered the internal combustion engine direct connection mode region, the process proceeds to Step S4, and if the series hybrid vehicle 1 has not entered the internal combustion engine direct connection mode region, the process returns to Step S3.

In Step S4, the controller 7 drives the electric motor 120, and the knock pins 51 and 52 are positioned in the parallel mode position, in which the first clutch mechanism 19 is engaged and the second clutch mechanism 21 is engaged, to activate the parallel mode.

In Step S5, the controller 7 further drives the electric motor 120, and the knock pins 51 and 52 are positioned in the internal combustion engine direct connection mode position, in which the first clutch mechanism 19 is disengaged and the second clutch mechanism 21 is engaged, to activate the internal combustion engine direct connection mode.

In Step S6, it is determined whether the series hybrid vehicle 1 is decelerating.

When the series hybrid vehicle 1 is decelerating, the process proceeds to Step S7, and when the series hybrid vehicle 1 is not decelerating, the process returns to Step S6.

In Step S7, it is determined whether deceleration a of the series hybrid vehicle 1 is greater than a threshold value a0. When the deceleration a of the series hybrid vehicle 1 is greater than the threshold value a0, the process proceeds to Step S8, and when the deceleration a of the series hybrid vehicle 1 is not greater than the threshold value a0, the process proceeds to Step S10.

In Step S8, the controller 7 drives the electric motor 120, and the knock pins 51 and 52 are positioned in the neutral mode position, in which the first clutch mechanism 19 is disengaged and the second clutch mechanism 21 is disengaged, to activate the neutral mode.

In Step S9, the controller 7 drives the electric motor 120, and the knock pins 51 and 52 are positioned in the second series mode position, in which the first clutch mechanism 19 is engaged and the second clutch mechanism 21 is disengaged, to activate the second series mode.

In Step S10, the controller 7 drives the electric motor 120, and the knock pins 51 and 52 are positioned in the parallel mode position, in which the first clutch mechanism 19 is engaged and the second clutch mechanism 21 is engaged, to activate the parallel mode.

In Step S11, the controller 7 drives the electric motor 120, and the knock pins 51 and 52 are positioned in the first series mode position, in which the first clutch mechanism 19 is engaged and the second clutch mechanism 21 is disengaged, to activate the first series mode.

As described above, the effects listed below are exhibited with the first embodiment.

(1) If the series hybrid vehicle 1 suddenly decelerates when the knock pins 51 and 52 are in the internal combustion engine direct connection mode position, in which the first clutch mechanism 19 is disengaged and the second clutch mechanism 21 is engaged, the electric motor 120 is driven and the drum 60 is moved in the a direction shown in the drawing, and the knock pins 51 and 52 are positioned in the neutral mode position, in which the first clutch mechanism 19 is disengaged an the second clutch mechanism 21 is disengaged, and the electric motor 120 is further driven and the drum 60 is moved in the a direction in the drawing, and the knock pins 51 and 52 are positioned in the second series mode position, in which the first clutch mechanism 19 is engaged and the second clutch mechanism 21 is disengaged. As a result, since it is possible to switch to the second series mode via the neutral mode, the first clutch mechanism 19 is engaged in the second series mode after reducing the differential rotation of the first clutch mechanism 19 in the neutral mode, so that it is possible to suppress torque fluctuation during mode switching.

(2) In the internal combustion engine direct connection mode, the first clutch mechanism 19 on the drive motor 2 side is brought into the disengaged state. As a result, decreased fuel efficiency performance due to the corotation of the drive motor 2 can be suppressed.

(3) The parallel mode position is disposed between the series mode position and the internal combustion engine direct connection mode position. As a result, it is possible to prevent an interruption in driving force when switching between the series mode and the internal combustion engine direct connection mode.

Figure 8:
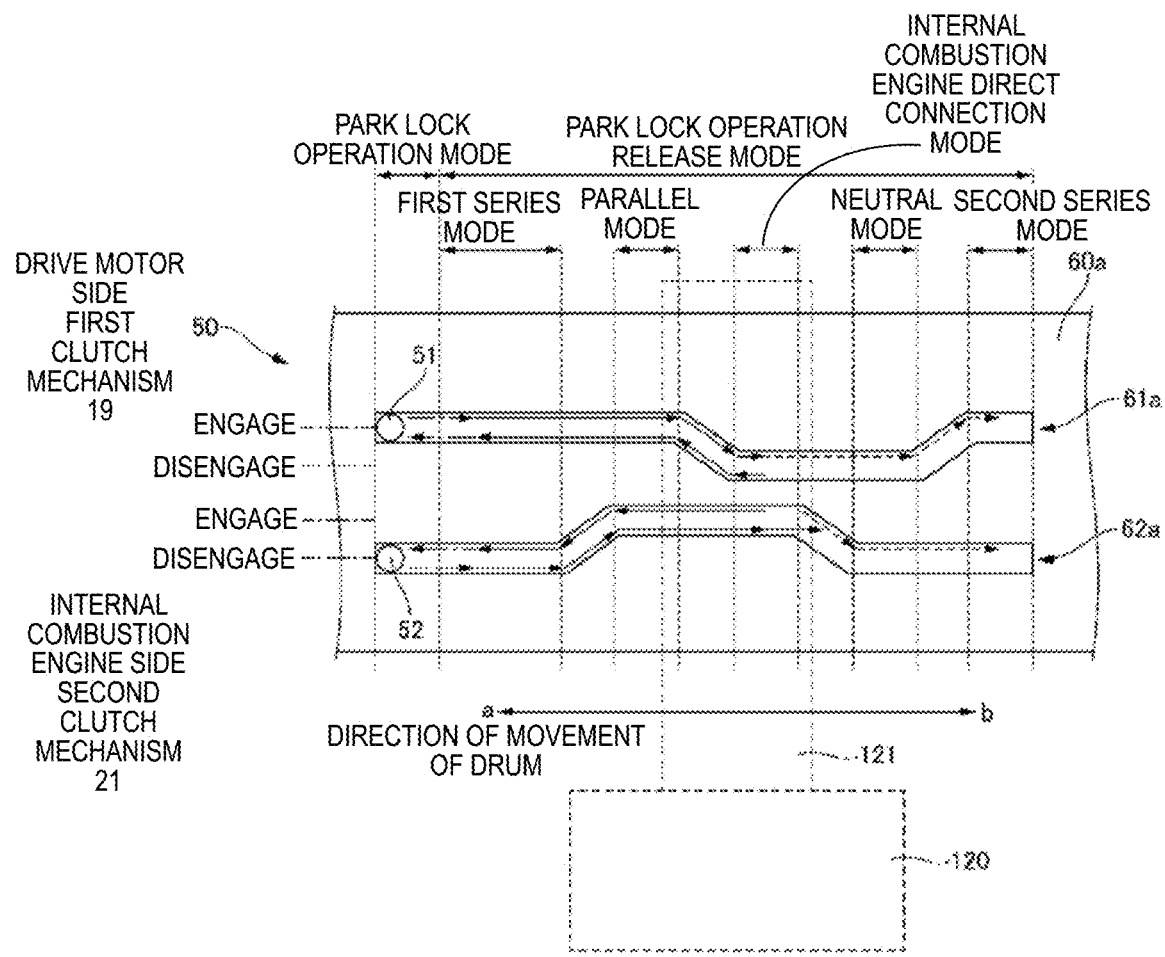
FIG. 8 is a diagram explaining mode switching of a shift cam mechanism of a second embodiment.

FIG. 8 is a diagram explaining the mode switching of the shift cam mechanism of the second embodiment.

In addition to its function as a mode actuator, electric motor 120a is provided with the function of park lock actuator. For this reason, a park lock operation mode position is added on the left side of the drawing of the first series mode position of a first cam groove 61a and second cam groove 62a formed on a drum 60a. Except for the foregoing, the configuration is the same as the first embodiment, so that the same parts are assigned the same reference numerals, and the descriptions thereof are omitted.

In addition to the effects of the first embodiment described above, the following effects can be obtained with the second embodiment.

(1) The same electric motor serves both as mode actuator and park lock actuator. Thus, it is possible to suppress an increase in the parts count.

Figure 9:
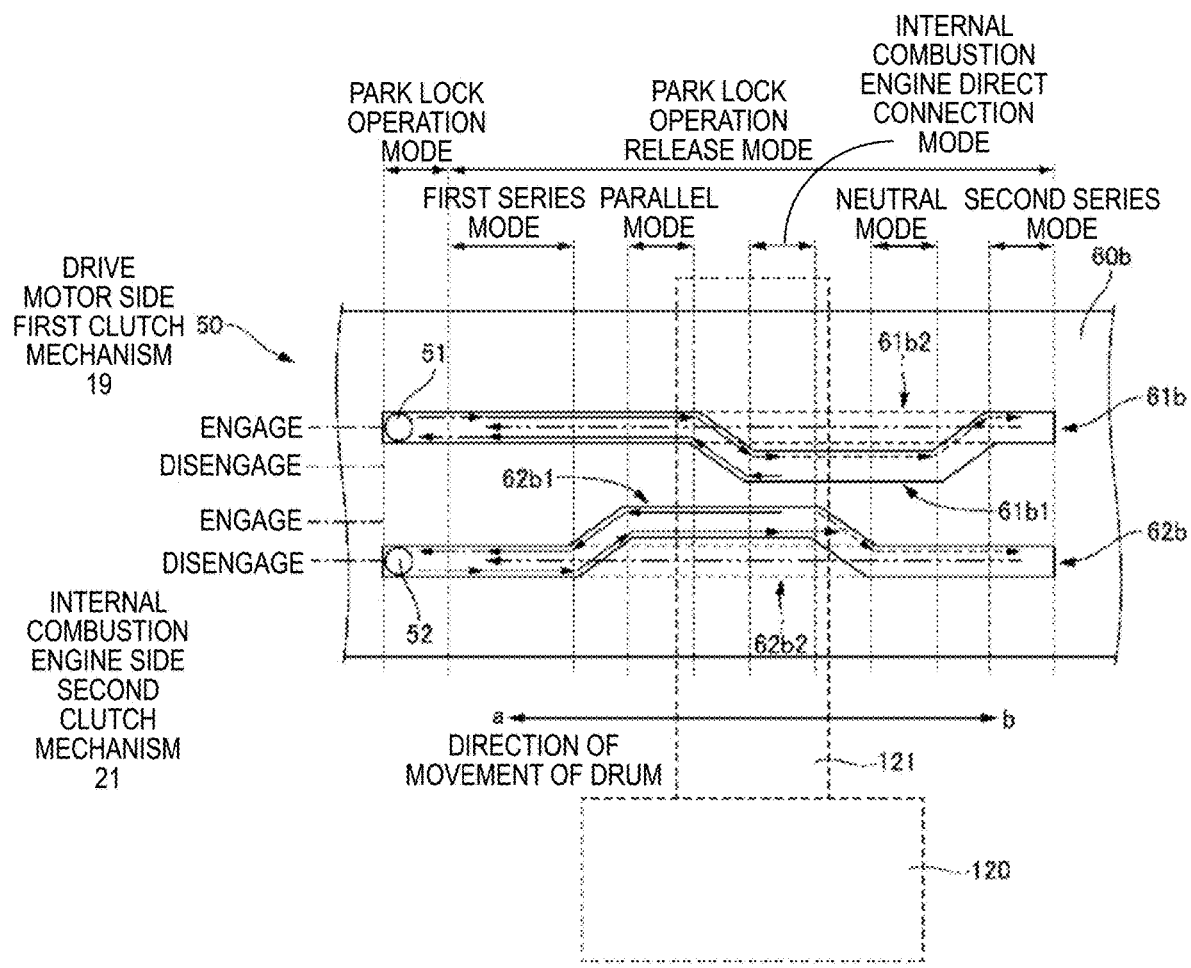
FIG. 9 is a diagram explaining mode switching of a shift cam mechanism of a third embodiment.
Figure 10:
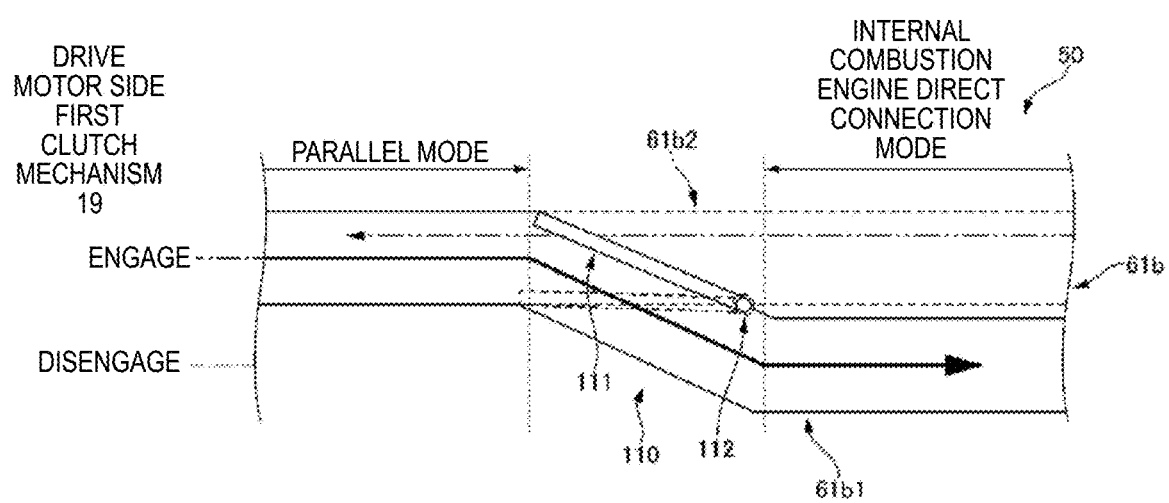
FIG. 10 is a diagram explaining a first cam groove path changing mechanism according to the third embodiment.
Figure 11:
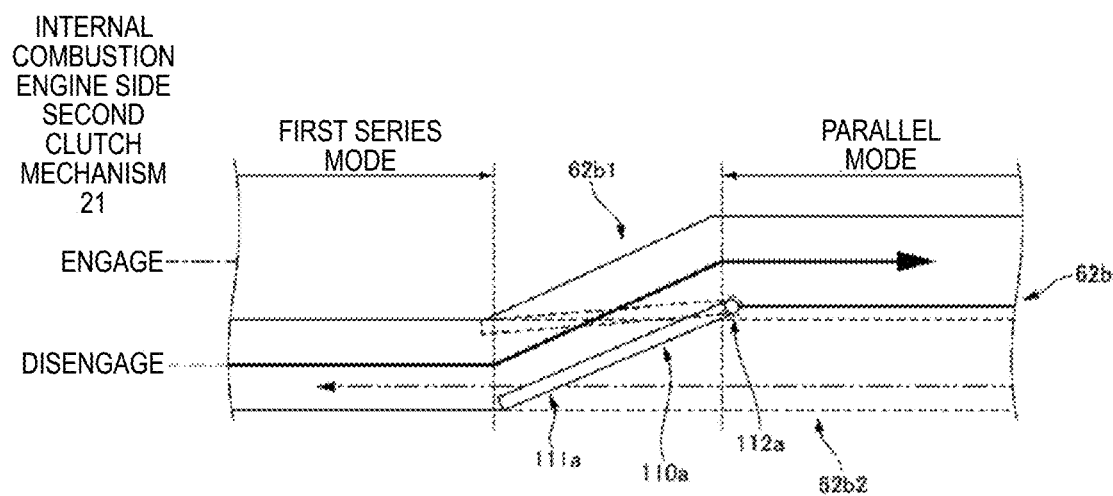
FIG. 11 is a diagram explaining a second cam groove path changing mechanism according to the third embodiment.

FIG. 9 is a diagram explaining the mode switching of the shift cam mechanism of a third embodiment, FIG. 10 is a diagram explaining the first cam groove path changing mechanism according to the third embodiment, and FIG. 11 is a diagram explaining the second cam groove path changing mechanism according to the third embodiment.

As shown in FIG. 9, a first cam groove 61b formed on a drum 60b is composed of a first path cam groove 61b1 from the park lock operation mode position to the second series mode position indicated by the solid line, and a second path cam groove 61b2 for linearly connecting the parallel mode position and the second series mode position and moving the first sleeve 20 therebetween as indicated by the broken line. Further, as shown in FIG. 9, a second cam groove 62b formed on the drum 60b is composed of a first path cam groove 62b1 from the park lock operation mode position to the second series mode position as indicated by the solid line, and a second path cam groove 62b2 for linearly connecting the first series mode position and the neutral mode position and moving the second sleeve 22 therebetween as indicated by the broken line. As a result, even when the series hybrid vehicle 1 suddenly decelerates and stops, as indicated by the arrows with a chain double-dashed line, it is possible to switch from the second series mode position to the first series mode position and to the park lock operation mode position without disengaging the first clutch 19.

Further, as shown in FIG. 10, a first cam groove changing mechanism 110 composed of a plate-shaped valve body 111 and a spring 112 is provided in the position where first cam groove 61b separates from the parallel mode position to the first path cam groove 61b1 and the second path cam groove 61b2. The plate-shaped valve body 111 is located in the position that closes the second path cam groove 61b2 by using the biasing force of the spring 112. As a result, as indicated by the solid arrows, the movement of the knock pin 51 from the parallel mode position to the internal combustion engine direct connection mode position can be reliably and smoothly carried out along the first path cam groove 61b1, and, as indicated by the arrow with the chain double-dashed line, the movement of the knock pin 51 from the second series mode position to the first series mode position via the neutral mode position, the internal combustion engine direct connection mode position, and the parallel mode position, can be reliably and smoothly carried out from the second path cam groove 61b2 to the first path cam groove 61b1, by the knock pin 51 pushing the plate-shaped valve body 111 downwardly, as indicated in the drawing, against the biasing force of the spring 112.

Further, as shown in FIG. 11, a second cam groove changing mechanism 110a composed of a plate-shaped valve body 111a and a spring 112a is provided at a position where second cam groove 62b separates from the first series mode position to the first path cam groove 62b1 and the second path cam groove 62b2. The plate-shaped valve body 111a is located in the position that closes the second path cam groove 62b2 by using the biasing force of the spring 112a. As a result, as indicated by the solid arrows, the movement of the knock pin 52 from the first series mode position to the parallel mode position can be reliably and smoothly carried out along the first path cam groove 62b1, and, as indicated by the arrow with the chain double-dashed line, the movement of the knock pin 52 from the second series mode position to the first series mode position via the neutral mode position, the internal combustion engine direct connection mode position, and the parallel mode position, can be reliably and smoothly carried out from the second path cam groove 62b2 to the first path cam groove 62b1, by the knock pin 52 pushing the plate-shaped valve body 111 upwardly, as indicated in the drawing, against the biasing force of the spring 112a. Except for the foregoing, the configuration is the same as the second embodiment, so that the same parts are assigned the same reference numerals, and the descriptions thereof are omitted.

Figure 12:
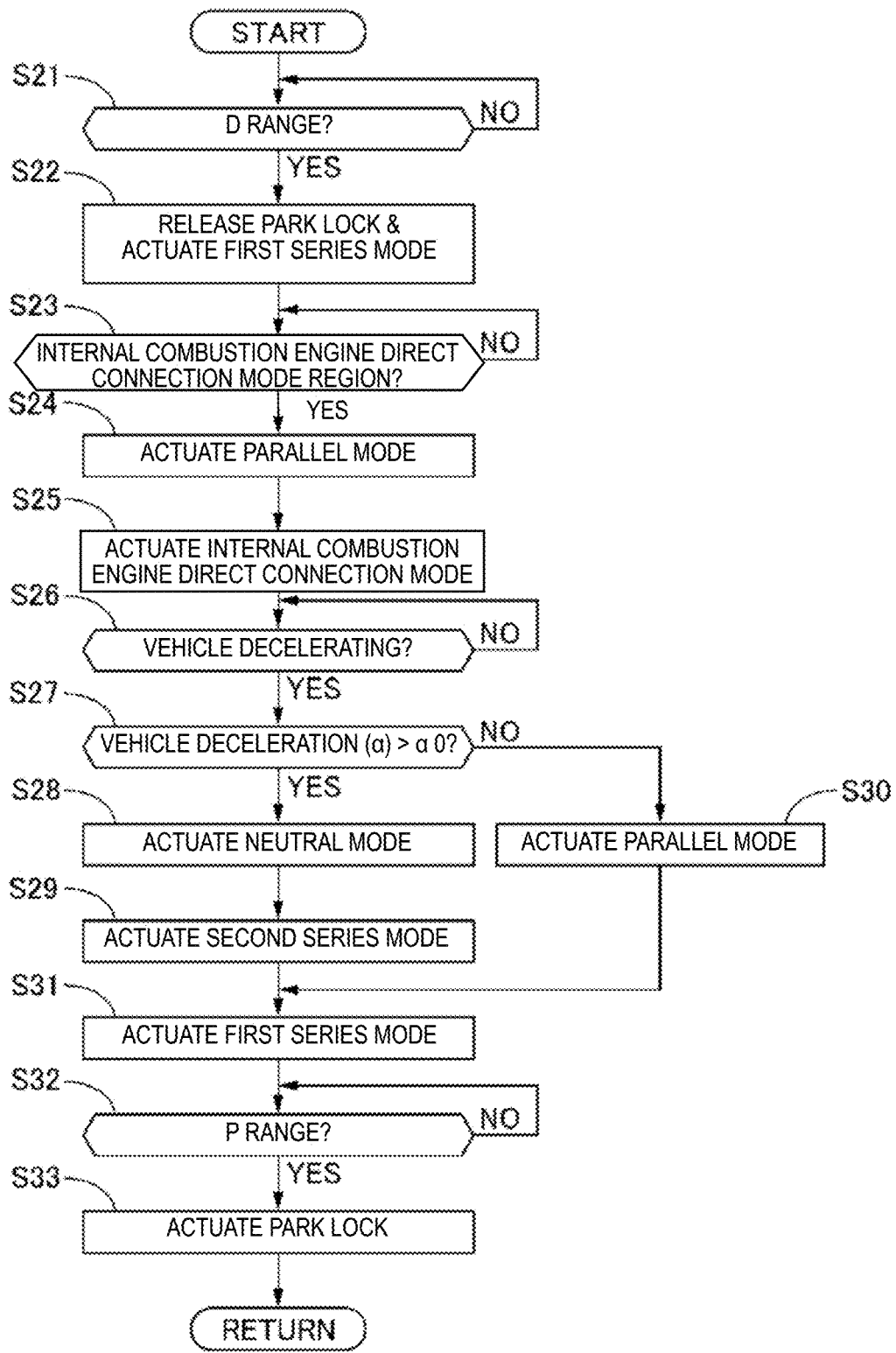
FIG. 12 is a flowchart showing a control routine of the shift cam mechanism of the third embodiment.

FIG. 12 is a flowchart showing a control routine of the shift cam mechanism of the third embodiment. This control routine is programmed in the controller 7. This flowchart is repeatedly executed at a prescribed calculation cycle.

In Step S21, it is determined whether it is in the D range. When it is in the D range, the process proceeds to Step S22, and when it is not in the D range, the process returns to Step S21.

In Step S22, the controller 7 drives the electric motor 120, and the knock pins 51 and 52 are positioned from the park lock operation mode position of the shift cam mechanism 50 to the park lock operation release mode position, and in the first series mode position, in which the first clutch mechanism 19 is engaged and the second clutch mechanism 21 is disengaged, to activate the first series mode.

In Step S23, it is determined whether the series hybrid vehicle 1 has entered the internal combustion engine direct connection mode region.

If the series hybrid vehicle 1 has entered the internal combustion engine direct connection mode region, the process proceeds to Step S24, and if the series hybrid vehicle 1 has not entered the internal combustion engine direct connection mode region, the process returns to Step S23.

In Step S24, the controller 7 drives the electric motor 120, and the knock pins 51 and 52 are positioned in the parallel mode position, in which the first clutch mechanism 19 is engaged and the second clutch mechanism 21 is engaged via the first path cam grooves 61b1, 62b1, to activate the parallel mode.

In Step S25, the controller 7 drives the electric motor 120, and the knock pins 51 and 52 are positioned in the internal combustion engine direct connection mode position, in which the first clutch mechanism 19 is disengaged and the second clutch mechanism 21 is engaged via the first path cam grooves 61b1, 62b1, to activate the internal combustion engine direct connection mode.

In Step S26, it is determined whether the series hybrid vehicle 1 is decelerating. When the series hybrid vehicle 1 is decelerating, the process proceeds to Step S27, and when the series hybrid vehicle 1 is not decelerating, the process returns to Step S26.

In Step S27, it is determined whether deceleration a of the series hybrid vehicle 1 is greater than a threshold value α0. When the deceleration a of the series hybrid vehicle 1 is greater than the threshold value α0, the process proceeds to Step S28, and when the deceleration a of the series hybrid vehicle 1 is not greater than the threshold value α0, the process proceeds to Step S30.

In Step S28, the controller 7 drives the electric motor 120, and the knock pins 51 and 52 are positioned in the neutral mode position, in which the first clutch mechanism 19 is disengaged and the second clutch mechanism 21 is disengaged, via the first path cam grooves 61b1, 62b1, to activate the neutral mode.

In Step S29, the controller 7 further drives the electric motor 120, and the knock pins 51 and 52 are positioned in the second series mode position, in which the first clutch mechanism 19 is engaged and the second clutch mechanism 21 is disengaged via the first path cam grooves 61b1, 62b1, to activate the second series mode position, and the process proceeds to Step S31.

In Step S30, the controller 7 drives the electric motor 120, and the knock pins 51 and 52 are positioned in the parallel mode position, in which the first clutch mechanism 19 is engaged and the second clutch mechanism 21 is engaged via the first path cam grooves 61b1, 62b1, to activate the parallel mode.

In Step S31, the controller 7 drives the electric motor 120 from the parallel mode position, in which the first clutch mechanism 19 is engaged and the second clutch mechanism 21 is disengaged, and positions the knock pins 51 and 52 in the first series mode position, in which the first clutch mechanism 19 is engaged and the second clutch mechanism 21 is disengaged, via the first path cam grooves 61b1, 62b1, or, when the series hybrid vehicle 1 suddenly decelerates and stops, drives the electric motor 120 from the second series mode position, in which the first clutch mechanism 19 is engaged and the second clutch mechanism 21 is disengaged, and positions the knock pins 51 and 52 in the first series mode position, in which the first clutch mechanism 19 is engaged and the second clutch mechanism 21 is disengaged, via the second path cam grooves 61b2, 62b2 and the first path cam grooves 61b1, 62b1, to activate the first series mode.

In Step S32, it is determined whether it is in the P range. When it is in the P range, the process proceeds to Step S33, and when it is not in the P range, the process returns to Step S32.

In Step S33, the controller 7 drives the electric motor 120, and the knock pins 51 and 52 are positioned in the park lock operation mode position via the first path cam grooves 61b1, 62b1, to activate the park lock operation mode.

In addition to the effects of the first second embodiment described above, the following effects can be obtained with the third embodiment.

(1) Even when the series hybrid vehicle 1 suddenly decelerates and stops, it is possible to switch from the second series mode position to the first series mode position and to the park lock operation mode position, without disengaging the first clutch 19.

(2) A first cam groove changing mechanism 110 composed of a plate-shaped valve body 111 and a spring 112 is provided at a position in which the first cam groove 61b separates from the parallel mode position to the first path cam groove 61b1 and the second path cam groove 61b2. As a result, the movement of the knock pin 51 from the parallel mode position to the internal combustion engine direct connection mode position can be reliably and smoothly carried out along the first path cam groove 61b1, and the movement of the knock pin 51 from the second series mode position to the first series mode position via the neutral mode position, the internal combustion engine direct connection mode position, and the parallel mode position, can be reliably and smoothly carried out from the second path cam groove 61b2 to the first path cam groove 61b1, by the knock pin 51 pushing the plate-shaped valve body 111 downwardly, as indicated in the drawing, against the biasing force of the spring 112.

(3) A second cam groove changing mechanism 110a composed of a plate-shaped valve body 111a and a spring 112a is provided at a position where second cam groove 62b separates from the series mode position to the first path cam groove 62b1 and the second path cam groove 62b2. As a result, the movement of the knock pin 52 from the series mode position to the parallel mode position can be reliably and smoothly carried out along the first path cam groove 62b1, and the movement of the knock pin 52 from the second series mode position to the first series mode position via the neutral mode position, the internal combustion engine direct connection mode position, and the parallel mode position can be reliably and smoothly carried out from the second path cam groove 62b2 to the first path cam groove 62b1, by the knock pin 52 pushing the plate-shaped valve body 111 upwardly, as indicated in the drawing, against the biasing force of the spring 112a.

Figure 13:
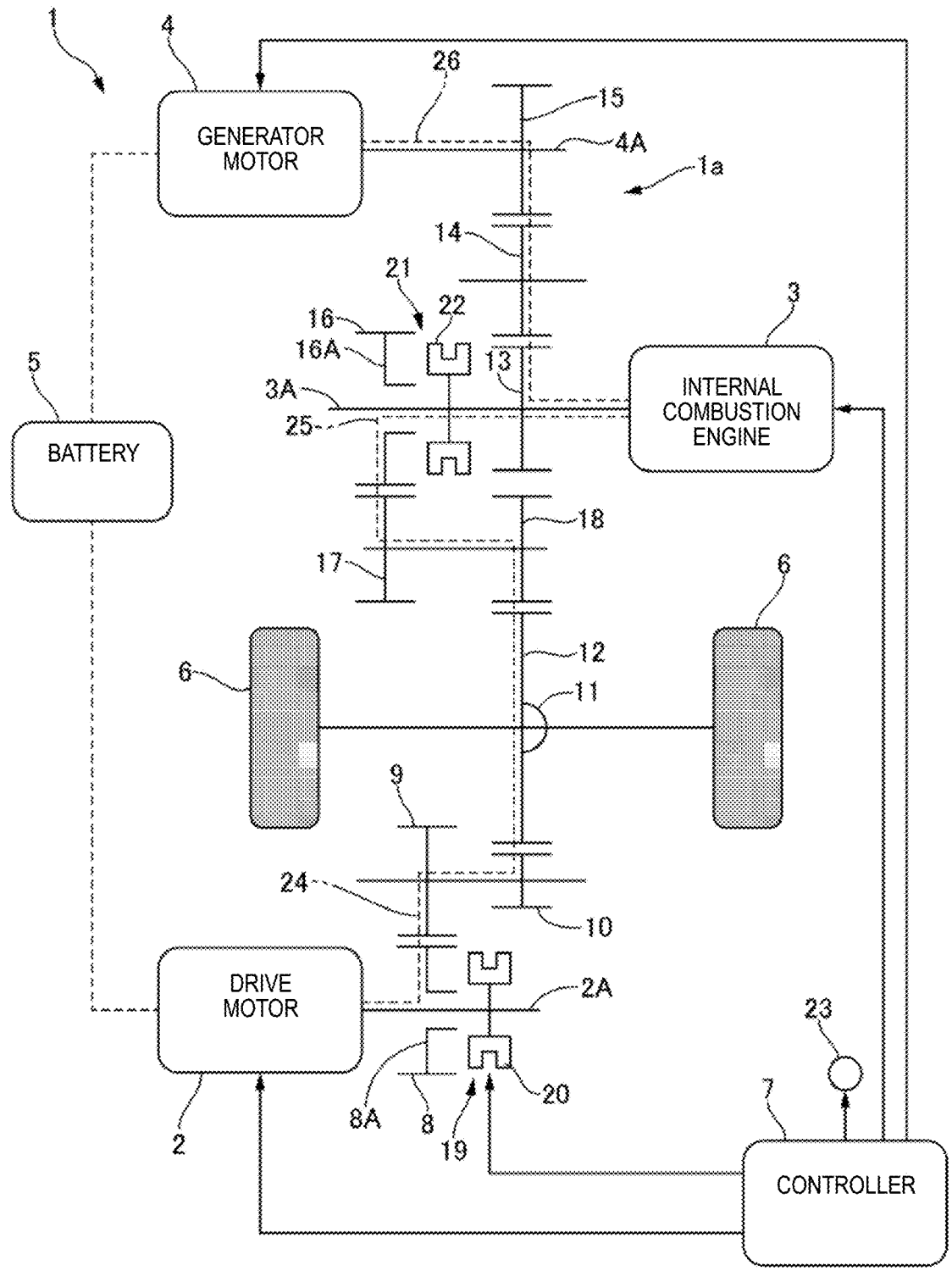
FIG. 13 is a diagram showing the schematic configuration of a power transmission device according to a fourth embodiment.
Figure 14:
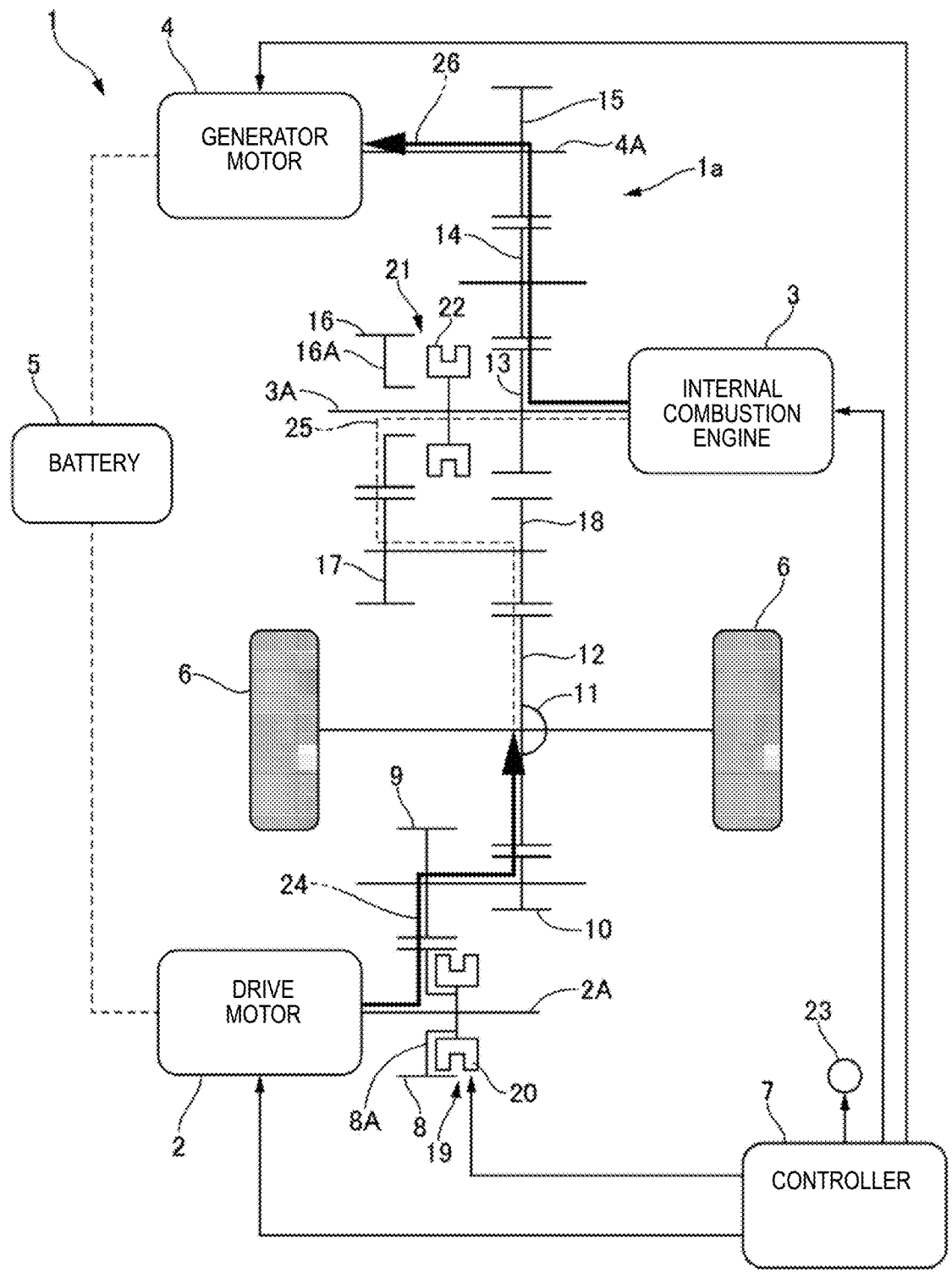
FIG. 14 is a diagram showing the power transmission state in a series mode of the fourth embodiment.
Figure 15:
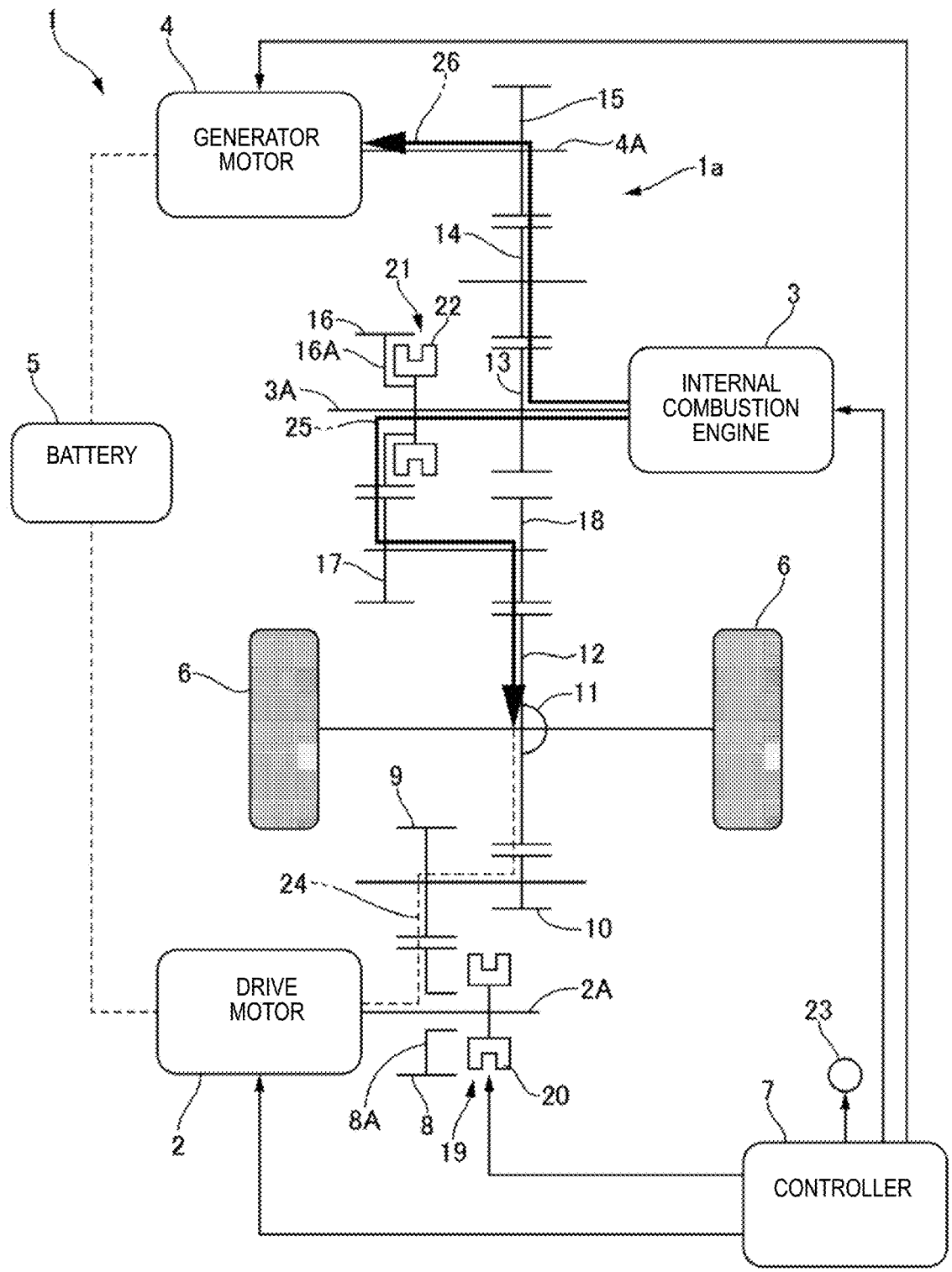
FIG. 15 is a diagram showing the power transmission state in an internal combustion engine direct connection mode of the fourth embodiment.

FIG. 13 is a diagram showing the schematic configuration of the vehicle power transmission device according to a fourth embodiment, FIG. 14 is a diagram showing the power transmission state in the series mode of the fourth embodiment, and FIG. 15 is a diagram showing the power transmission state in the internal combustion engine direct connection mode of the fourth embodiment.

A dog clutch is used in addition to the two-way clutches 40, 30 of the first clutch mechanism 19 and the second clutch mechanism 21 according to the first embodiment.

The first clutch mechanism 19 is a so-called dog clutch, composed of the first sleeve 20 that is supported by the rotary shaft 2A so as to be axially slidable, and an engagement portion 8A provided on the first reduction gear 8. That is, when the first sleeve 20 moves in the direction of the first reduction gear 8, and when a plurality of convex portions provided on the first sleeve 20 so as to project in the direction of the engagement portion 8A, and a plurality of convex portions provided on the engagement portion 8A so as to project in the direction of the first sleeve 20 are arranged in a staggered manner in the rotational direction and mesh with each other, the engaged state is established. From this state, when the first sleeve 20 moves in the direction opposite to that of the first reduction gear 8 and the meshing of the convex portions of the two components is eliminated, disengaged state is established.

Further, the second clutch mechanism 21 is a so-called dog clutch, composed of the second sleeve 22 that is supported by the rotary shaft 3A so as to be axially slidable, and an engagement portion 16A provided on the fourth reduction gear 16. That is, when the second sleeve 22 moves in the direction of the fourth reduction gear 16, and when a plurality of convex portions provided on the second sleeve 22 so as to project in the direction of the engagement portion 16A and a plurality of convex portions provided on the engagement portion 16A so as to project in the direction of the second sleeve 22 are arranged in a staggered manner in the rotational direction and mesh with each other, the engaged state is established. From this state, when the second sleeve 22 moves in the direction opposite to that of the fourth reduction gear 16 and the meshing of the convex portions of the two components is eliminated, the disengaged state is established. Except for the foregoing, the configuration is the same as the first embodiment, so that the same parts are assigned the same reference numerals, and the descriptions thereof are omitted.

As described above, the fourth embodiment exhibits the same effects as the first embodiment. Further, the shift cam mechanism 50 of the second embodiment or the third embodiment may be applied to the fourth embodiment. At the same time, in addition to the effects of the first embodiment described above, the fourth embodiment can exhibit the effects of the second embodiment or the third embodiment.

Embodiments of the present invention were described above, but the above-described embodiments illustrate only a portion of the application examples of the present invention, and are not intended to limit the technical scope of the present invention to the specific configurations of the above-described embodiments.

The invention claimed is:
1. A power transmission device comprising:
a generator that is driven by power of an internal combustion engine;
a drive motor that is driven by electric power generated by the generator;
a drive wheel that is driven by the power of the internal combustion engine or by the power the drive motor;
a first power transmission path configured to transmit power between the drive motor and the drive wheel;
a first clutch mechanism provided with a first sleeve that is engaged or disengaged so as to connect or disconnect power transmission of the first power transmission path;
a second power transmission path configured to transmit power between the internal combustion engine and the drive wheel;

a second clutch mechanism provided with a second sleeve that is engaged or disengaged so as to connect or disconnect power transmission of the second power transmission path; and a shift cam mechanism configured to be actuated by a mode actuator, the shift cam mechanism being further configured to switch between engagement and disengagement of the first clutch mechanism and the second clutch mechanism, and having a first cam groove and a second cam groove into which the first sleeve and the second sleeve are respectively fitted, the first cam groove and the second cam groove of the shift cam mechanism being further configured to move the first sleeve and the second sleeve, and having a first series mode position in which the first clutch mechanism is engaged and the second clutch mechanism is disengaged, a parallel mode position in which the first clutch mechanism is engaged and the second clutch mechanism is engaged, an internal combustion engine direct connection mode position in which the first clutch mechanism is disengaged and the second clutch mechanism is engaged, a neutral mode position in which the first clutch mechanism is disengaged and the second clutch mechanism is disengaged, and a second series mode position in which the first clutch mechanism is engaged and the second clutch mechanism is disengaged, and the first series mode position, the parallel mode position, the internal combustion engine direct connection mode, the neutral mode position, and the second series mode position being arranged in that order.

2. The power transmission device according to claim 1, wherein the mode actuator includes a function of a park lock actuator, and the first cam groove and the second cam groove of the shift cam mechanism have a park lock operation mode position provided before the first series mode position.

3. The power transmission device according to claim 2, wherein the first cam groove of the shift cam mechanism has a first path cam groove for moving the first sleeve in the order of the first series mode position, the parallel mode position, the internal combustion engine direct connection mode position, the neutral mode position and the second series mode position, and a second path cam groove that linearly connects the parallel mode position and the second series mode position for moving the first sleeve, and the second cam groove of the shift cam mechanism has a third path cam groove for moving the second sleeve in the order of the first series mode position, the parallel mode position, the internal combustion engine direct connection mode position, the neutral mode position, and the second series mode position, and a fourth path cam groove that linearly connects the first series mode position and the neutral mode position for moving the second sleeve.

4. The power transmission device according to claim 3, wherein a first cam groove path changing mechanism is provided between the parallel mode position of the first cam groove of the shift cam mechanism and the internal combustion engine direct connection mode position of the first cam groove of the shift cam mechanism, and a second cam groove path changing mechanism is provided between the first series mode position of the second cam groove of the shift cam mechanism and the parallel mode position of the second cam groove of the shift cam mechanism.

5. The power transmission device according to claim 4, wherein the first cam groove path changing mechanism includes a first plate-shaped valve body and a first spring, the second cam groove path changing mechanism includes a second plate-shaped valve body and a second spring, the first plate-shaped valve body closes the second path cam groove by using a biasing force of the first spring, and the second plate-shaped valve body closes the second path cam groove by using a biasing force of the second spring.

* * * * *